United States Patent [19]

Kanda et al.

[11] 3,717,846

[45] Feb. 20, 1973

[54] SYSTEM FOR THE DETECTION OF FAULTS IN A MAGNETIC RECORDING MEDIUM

[75] Inventors: Kaoru Kanda, Yokohama; Tetuo Nagahori, Kawasaki, both of Japan

[73] Assignee: Fujitsu Limited, Kawasaki, Japan

[22] Filed: Dec. 22, 1971

[21] Appl. No.: 210,805

[30] Foreign Application Priority Data

Dec. 25, 1970 Japan ..............................45/129744

[52] U.S. Cl. ......................340/146.1 F, 340/174.1 B

[51] Int. Cl. ..........................................G11b 27/36

[58] Field of Search ..................340/146.1 F, 174.1 B

[56] References Cited

UNITED STATES PATENTS 2,975,407 3/1961 O'Brien..........................340/174.1 B Primary Examiner—Malcolm A. Morrison
Assistant Examiner—R. Stephen Dildine, Jr.
Attorney—Staas, Halsey & Gable

[57] ABSTRACT

A system for the detection of faults in a magnetic recording medium such as a magnetic tape used in an information processing unit. The system is adapted to directly record information, provide an indication of erroneously recorded information, and erase that portion of the recording medium upon which information is erroneously recorded. The erase procedure is accompanied by a simultaneous reading by the read head of the portion of the magnetic recording medium being erased to determined the presence or absence of faults thereon which is indicated by the generation of corresponding noise signals. The system issues a tape reject signal when the noise signals generated by the faults comprise at least a predetermined number.

8 Claims, 16 Drawing Figures

SYSTEM FOR THE DETECTION OF FAULTS IN A MAGNETIC RECORDING MEDIUM

BACKGROUND OF THE INVENTION

1. Field of the Invention

The invention relates to the detection of faults in a magnetic recording medium such as a magnetic tape used in an information processing unit. The system issues a tape reject signal in the event a noise pulse generated in response to a fault is sufficiently large.

2. Description of the Prior Art

The use of external auxiliary memory devices such as a magnetic tape unit associated with an information processing system is well known in the art. The magnetic tape unit is essentially an input/output device which functions to write and read information into and out of the magnetic recording medium through the use of magnetic heads. The magnetic medium usually comprises a tape consisting of a mylar base material coated with magnetic particles of iron oxide. The arrangement of the iron oxide particles is indicative of the recorded information and the magnetic head detects the variation of magnetic flux on the magnetic tape to reproduce the recorded information. If the tape comprises a portion having a fault, for example, where the iron oxide coating is stripped, information cannot be recorded on that portion of the tape and, further, when that portion of the tape is read an erroneous signal will be generated because of the variation of magnetic flux at the interface between the coated and non-coated portions of the tape.

In prior art devices information is first written and then immediately read from the magnetic tape, and if the writing is erroneous because of faults in the magnetic tape, that portion of the magnetic tape is magnetically erased. It is normal in the prior art not to check the magnetic tape for faults during the erasing operation and succeeding writing is made directly onto the same magnetic tape. Consequently when the magnetic tape is sequentially read, undesirable signals are read from the previously erased portions because of the faults and these may erroneously be detected as information signals if they meet certain predetermined criteria.

SUMMARY OF THE DISCLOSURE

These and other disadvantages of the prior art are solved by the instant invention which provides a system to detect faults in the magnetic tape associated with an information processing unit. The system utilizes a magnetic head consisting of a write head and a read head adjacently disposed thereto. The write head is adapted to write or record information onto the magnetic tape in the form of a series of blocks of information, and the read head is adapted to sequentially read the so-recorded information to provide a check for accuracy. When an error is detected in the recorded information, the magnetic tape is advanced or backspaced and the erroneously recorded information block is erased from the starting end of the block, with the erased portion being sequentially read by the read head in order to detect the faults on the magnetic tape.

The system consequently operates on the fail-safe principle and provides an indication of faults on a magnetic tape which may then be rejected for further use. Another aspect of the invention is to provide an electronic counter which is operable to compute the number or duration in time of bytes recorded on a faulty portion of the magnetic tape and corresponding circuitry for the issuance of an error signal when the bytes counted by the electronic counter exceed a predetermined number or time duration. If the predetermined number or time duration is not reached, the tape is considered suitable for further use and is not rejected, thereby precluding the necessity to stop the information processing apparatus and reject a suitable tape.

DETAILED DESCRIPTION OF THE INVENTION

Figure 1:
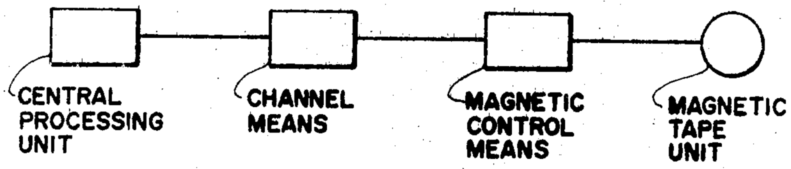
FIG. 1 is a schematic block diagram of an information processing unit.
Figure 2:
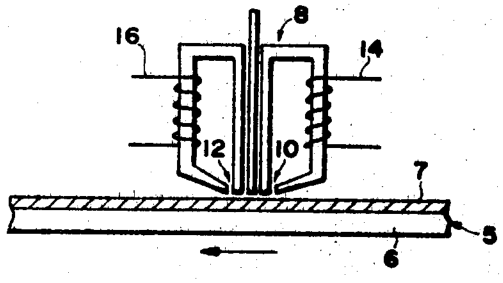
FIG. 2 is a diagram showing read/write heads and a magnetic tape.
Figure 3:
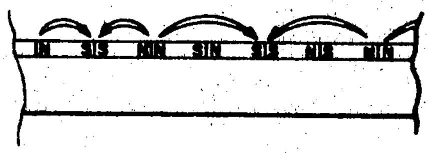
FIG. 3 is a diagram showing a typical distribution of magnetic flux of a microscopic magnet on the magnetic tape recording medium.

FIG. 1 shows central processing unit 1 connected through channel means 2 to magnetic control means 3, the latter controlling magnetic tape unit 4 depending upon the instructions issued by the channel means. Control of instructions for writing, reading and erasing, and transfer of condition information after execution of instructions such as whether or not a given instruction has been executed correctly and of information to be reported to the channel means or the information processing means is accomplished through the information processing means. This procedure is known in the art. FIG. 2 shows the operation of a write head in conjunction with a magnetic medium such as a magnetic tape 5 comprising mylar base 6 and a coating consisting of a magnetic material 7, which typically would have a thickness of several microns. Magnetic head 8 defines a write gap 10 and a read gap 12, which are magnetically coupled to the magnetic material 7. During the write operation, magnetic tape 5 travels to the left as indicated by the direction arrow and a write or record current is applied to write coil 14 to magnetize magnetic material 7 in accordance with the applied write current and thereby record the information, as illustrated in FIG. 3. When the recorded portion of magnetic tape 5 passes in the region of read gap 12, the magnetic flux causes a current to be generated in read coil 16, which consequently detects the magnetized condition in the form of a read signal.

Figure 4A:
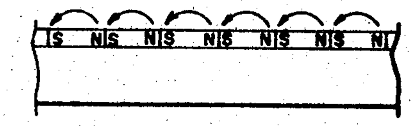
FIGS. 4*a* and 4*b* are diagrams showing the distribution of magnetic flux, with FIG. 4*b* showing the result of the presence of a cut on the magnetic tape.
Figure 4B:
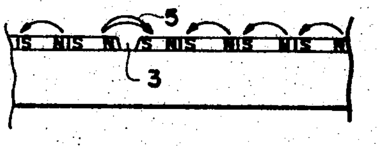

In order to effect tape erasure a current is applied to the write coil in only one direction, so that the magnetic material is coordinated for polarities in the same direction, with the result that no change occurs in the direction of magnetic flux as shown in FIG. 4*a*. However, if the magnetic material comprises a fault such as a cut 3 therein as shown in FIG. 4*b*, the erase current will cause a change in direction of magnetic flux 5 in that portion of the tape, which will be detected as a signal when the read gap passes thereover.

Figures 5, 6, 7:
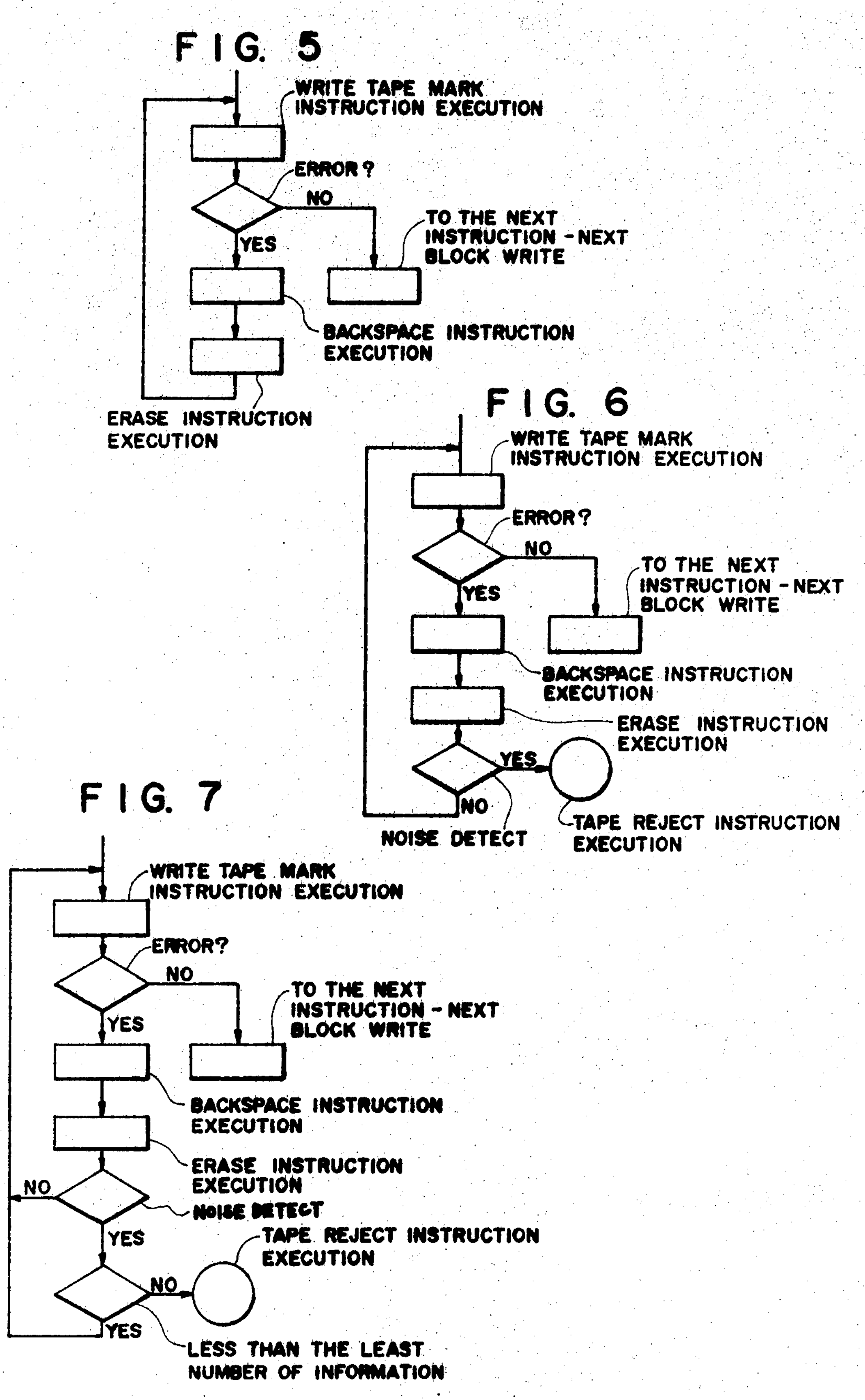
FIG. 5 is a flow chart showing the conventional method used in the event of a writing error.
FIG. 6 is a flow chart for performing the system according to the invention.
FIG. 7 is a flow chart for performing the present invention having a further improvement over the system shown by the flow chart of FIG. 6.

FIG. 5 is a flow chart illustrating the write/error procedure known in the prior art. After execution of a write instruction, the written or recorded state of the tape is checked and, if no error is present, the instruction for writing the subsequent block is executed. If there is an error present, however, the consequent indication causes a tape backspace and erase instruction, causing the erroneously recorded information block to be erased by erasing a predetermined portion of the tape. Thereafter, the write instruction is executed again.

The procedure illustrated in the flow chart of FIG. 5 does not provide for read checking during the erasing operation. If the magnetic tape is read during the erase operation, the fault, as for example, shown in FIG. 4*b* may be read as recorded processed data. In order to distinguish between noise resultant from such faults and a true data block, it is known to recognize a block not having a predetermined number of information bits as a noise block. However, it is possible for the magnetic tape to have a fault condition which is read as comprising the predetermined number of information bits, and consequently is erroneously recognized as a data block.

Applicants' invention may be described with reference to FIG. 6, which is a flow chart of the procedure employed according to the invention. If there is an error in the write instruction, the corresponding block is back-spaced and the erase operation is commenced. However, as the block is being erased it is also read and the presence or absence of a variation of a magnetic flux which is representative of a fault on the magnetic tape is sensed by the reading head. When a noise signal representative of a fault is detected, the portion of the magnetic tape where the noise signal is detected, is rejected for further processing, and is replaced with a new magnetic tape and the writing operation is repeated.

FIG. 7 is a flow chart representing a modification to the method described with relation to the flow chart of FIG. 6. In the FIG. 7 embodiment of the invention, the erasure of a block of information indicated to contain an error is accompanied by a simultaneous reading of the tape. If less than a predetermined number of information signals are thusly read, it is determined that the block has been properly erased and writing is shifted to a subsequent block. However, in the event that faults in the portion of the magnetic tape being erased are serious and extensive, the number of information signals read may exceed the predetermined number, and the magnetic tape will be rejected as unusable.

FIG. 8 is a detailed electrical schematic diagram of the circuit according to the invention. The magnetic tape control device 20 includes a tape erasing length determination section having flip-flops 21, 22 and 23, and a counter 24, the operation of which is described in detail hereafter, and a noise processing section 19 having flip-flops 25, 26 and 27 with their outputs being connected to OR-gate 28, the output of the latter being connected to counter 29. In addition, a byte counter 18, having flip-flops 30, 31 and 32, and AND-gates 33, 34, 35 and 36 is provided, together with a tape reject signal generating section 17 having AND-gates 37 and 38 and an inverter 39. The magnetic tape control device 20 functions to control magnetic tape unit 40 which has a tape transport unit 41 to transport magnetic tape 42 in the desired direction. Magnetic head 43 is also provided, and if it is assumed tape 42 has three tracks, peak detectors 44, 45 and 46 respectively connect a track between the magnetic head and flip-flops 25, 26 and 27 of the noise signal processing section. The operation of the circuit FIG. 8 will now be described in detail.

When magnetic tape control unit 20 receives a signal corresponding to an erase instruction, a signal is generated on line 47 to set flip-flop 21 and produce a corresponding output therefrom. The output of flip-flop 21 is applied by line 50 to the magnetic tape unit 40 in order to control it to a write condition. The magnetic tape unit 40 then applies a confirmation signal to line 51 to initiate the writing operation and flip-flop 21 is thus reset through AND-gate 53. The output of AND-gate 53 additionally sets flip-flops 22 and 23, and the corresponding output of flip-flop 22 is applied to the magnetic tape unit by line 54 to initiate transport of tape 42. Flip-flop 23 functions to gate the operation of counter 24 which determines the length of tape to be erased, that is, the transport time of magnetic tape 42. Thus as termination of the set erasing time is approached, decoder 55 is controlled by counter 24 to cause flip-flops 22 and 23 to be reset. Resetting of flip-flop 22 causes removal of the tape transport initiation signal on line 54 and consequently terminates transport of the tape.

Figures 8A, 8B:
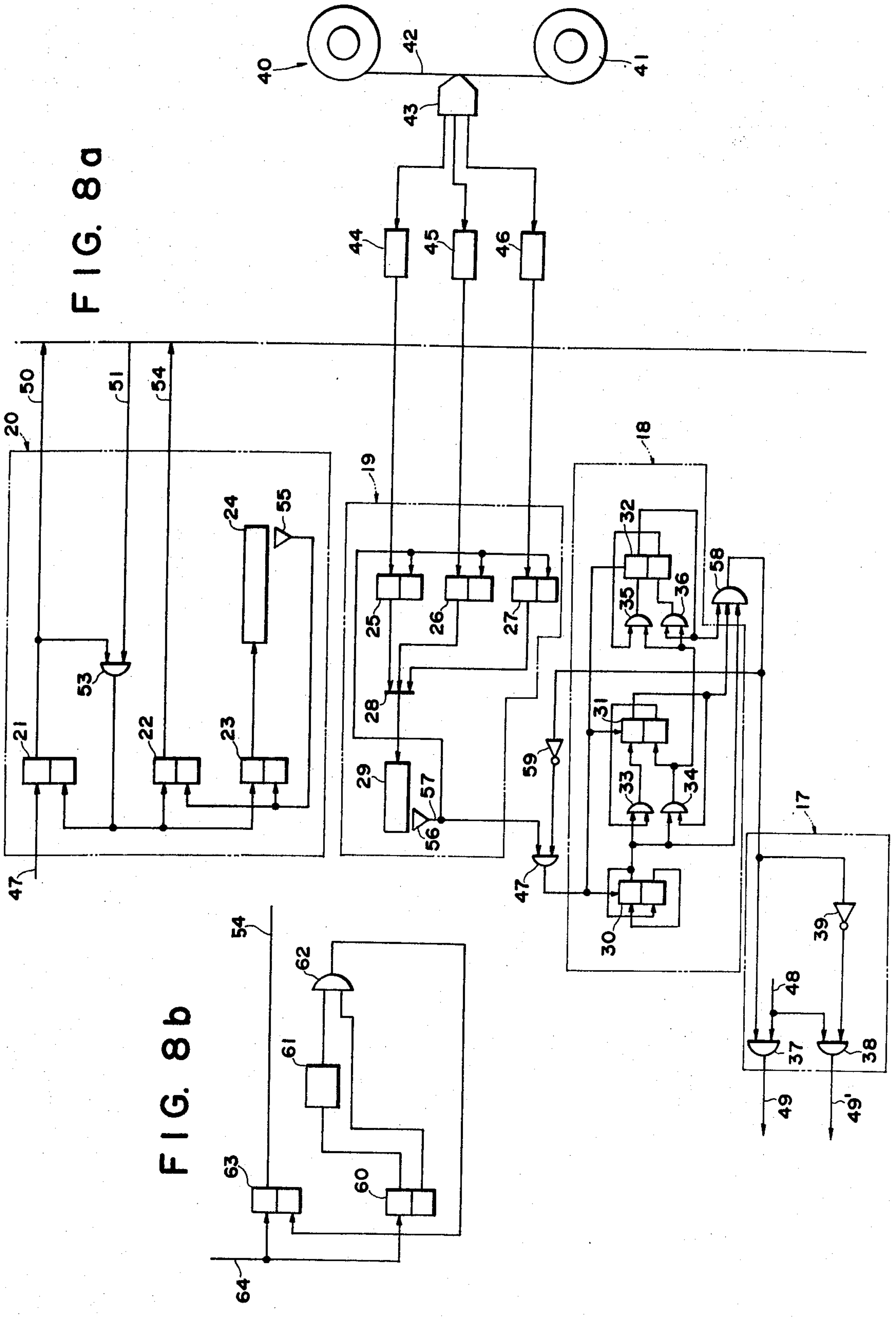
FIGS. 8*a* and 8*b* are circuit diagrams of circuits for practicing the system shown in the flow chart of FIG. 7, with FIG. 8b showing a modification of a part of the circuit of FIG. 8*a;*

In the described circuit of FIG. 8*a*, a counter is provided to determine the erasing time and therefore the length of tape erased. However, this is not to be interpreted as limiting applicants' invention to the use of a counter, as other equivalent means may be substituted therefor. For example, FIG. 8*b* shows the use of a monostable multivibrator 60, which may be used to determine the tape transport time. The multivibrator 60 may be activated for a predetermined period of time corresponding to the tape transport time, by a set signal applied to line 64, which also sets flip-flop 63 to initiate tape transport. The activation time of multivibrator 60 is transformed into a pulse signal through delay circuit 61 and AND-gate 62. The so-obtained pulse signal is applied to reset flip-flop 63, which would remove the tape transport initiation signal from line 54, the latter corresponding to line 54 of FIG. 8, thereby stopping tape transport.

In FIG. 8, as the variation of magnetic flux is detected by the read portion of magnetic head 43 during the erasing operation, peak detectors 44, 45 and 46 will be activated in response to the corresponding track of magnetic tape 42, assuming the magnetic tape consists of three tracks. The peak detectors function to amplify the read signals and detect the peak read signal, which is then transmitted to the magnetic tape control unit. The operation of this section of the circuit may be described with reference to FIGS. 9 and 10.

Figure 9:
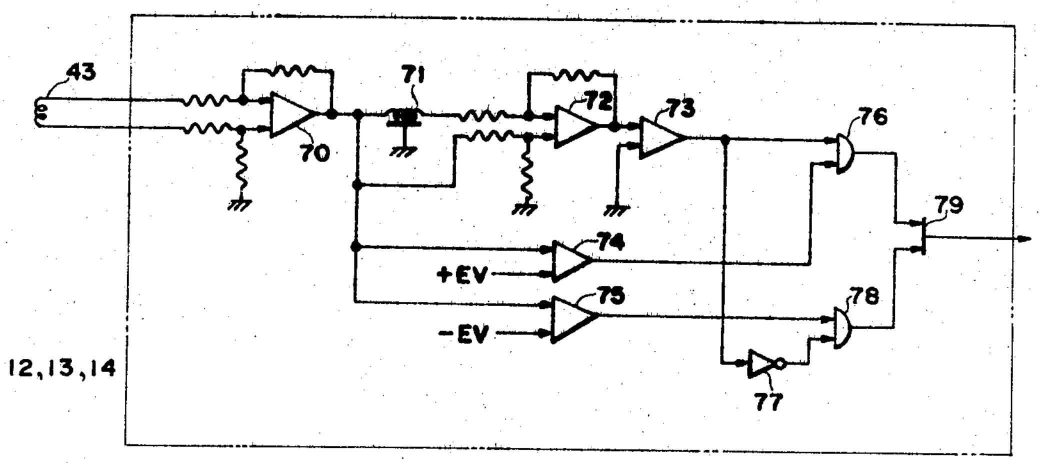
FIG. 9 is a circuit diagram of a peak detector.

In FIG. 9 a peak detector circuit of the type that may be used in the circuit shown in FIG. 8 is shown in detail. Amplifier 70 is connected to the output of the read head 43 and the output of amplifier 70 is connected through delay element 71 to the input of amplifier 72. The output of amplifier 72 is connected to one input of level comparator 73, with the other input to level comparator 73 being connected to ground. The output of amplifier 70 is also directly connected to one input of each of level comparators 74 and 75. The outputs of level comparators 73 and 74 are connected as the inputs to AND-gate 76, and the output of level comparator 73 is also inverted by inverter 77 and applied to one input of AND-gate 78, the other input thereto being the output of level comparator 75. The outputs of AND-gates 76 and 77 are connected as the inputs to OR circuit 79.

Figure 10:
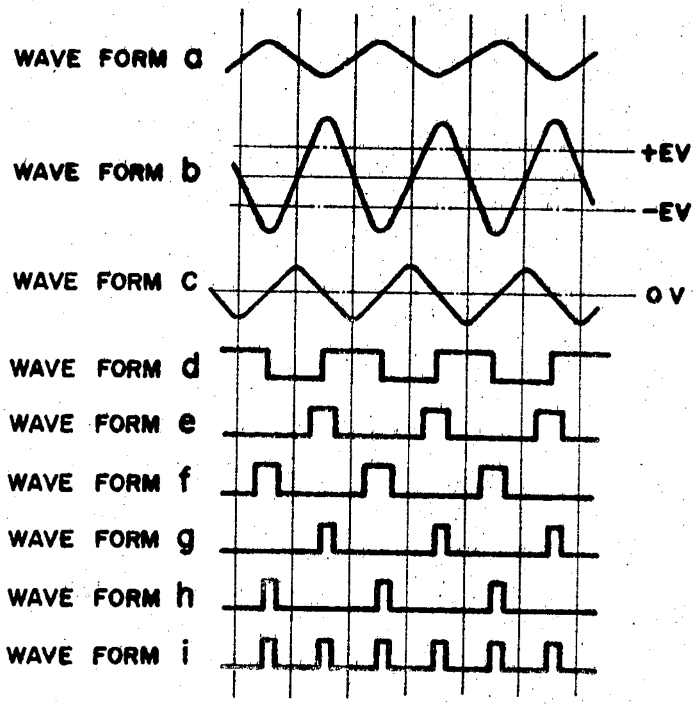
FIG. 10 shows waveforms at various points in the circuit of FIG. 9.

The operation of the peak detector circuit shown in FIG. 9 may be explained with reference to the waveforms illustrated in FIG. 10. The output of read head 43 is shown by waveform *a*, and the amplified version thereof appearing at the output of amplifier 70 is shown by waveform *b*. The output of amplifier 70 is differentiated by a differentiating circuit consisting of delay element 71 and amplifier 72, as shown by waveform *c*. Level comparator 73, in addition to receiving the output of amplifier 72, also receives zero or ground input voltage for comparison. The output of amplifier 72 is thus sliced by the level comparator 73 to produce an output voltage as shown by waveform *d*. Level comparator 74 has predetermined voltage $+E_v$ applied to its other input, and level comparator 75 has predetermined voltage $+E_v$ applied to its other input. Thus, the output of amplifier 70 is sliced at levels $+E_v$ and $-E_v$ by level comparators 74 and 75 respectively having comparator inputs thereto of $+E_v$ and $-E_v$.

The AND operation of the outputs of level comparators 73 and 74 is effected by AND-gate 76, which has an output waveform shown by waveform *g*. The AND operation of the inverted signal of the output of level comparator 73 and the output of level comparator 75 is effected by AND-gate 78 to produce an output signal therefrom shown by waveform *h*. The outputs of AND-gates 76 and 78 are combined through OR-gate 79 as shown by waveform *i*, which constitutes the output signal of the peak detector. The read reproducing circuit described with relation to FIGS. 9 and 10 is an illustrative circuit that may be used, and may be substituted therefor without departing from the essential characteristics of the instant invention.

With reference to FIG. 8, the outputs of peak detectors 44, 45 and 46 are respectively applied to the set inputs of flip-flops 25, 26 and 27. When a noise signal is detected in a particular track, the corresponding flip-flop is set. If any of flip-flops 25, 26 and 27 are thus set, OR-gate 28 will produce a corresponding output to initiate operation of counter 29.

The counter 29 determines the time of sampling the state of flip-flops 25, 26 and 27 as a read information of a byte in a normal read operation. This is important because the timing set up by flip-flops 25, 26 and 27 will vary with the mechanical displacement of their respective reading heads and slanted travel of the magnetic tape, as well as because the information should be received as one information of a byte set up in a fixed time from a point at which a first bit is set up. Generally this time is fixed at one-half the interval of a single byte because at this time an allowable limit of displacement for each track would become maximum for free reading. Counter 29 is actuated for erasing similarly as in the ordinary reading operation and when a limit tim is reached, decoder 56 is responsive to issue a sampling timing pulse 57 to reset flip-flops 25, 26 and 27. Thus the noise generated from faults in the magnetic tape during the time period from initiation from the start of counting of counter 29 to the emergence of pulse 57 may be regarded as the noise of one byte, how many times it may occur.

Figure 11:
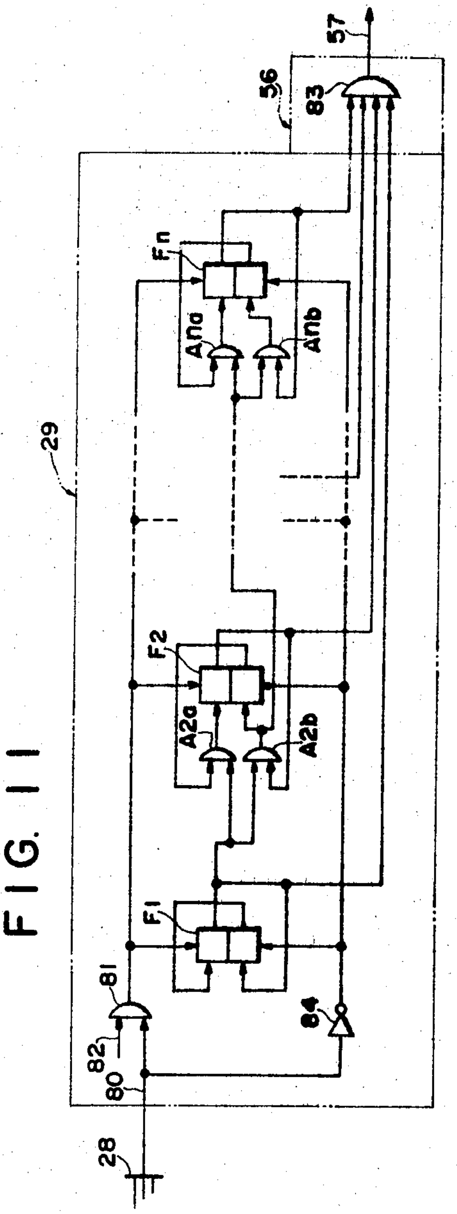
FIG. 11 is a detailed circuit diagram of the counter and decoder of FIG. 8.

Details of the operation of counter 29 and decoder 56 are given in FIG. 11. The counter comprises flip-flop group F1, F2, . . . F*n* and AND-gate group A2*a*, A2*b*, . . . A*na*, A*nb*. A counter driving signal is applied by line 80, which comprises the output signal of OR-gate 28 of FIG. 8, to AND-gate 81. It is added in common to the clock terminals of flip-flop group F1, F2, . . . F*n*, and AND-gate group A2*a*, A2*b*, . . . A*na*, A*nb*, which counts clock pulse 82 when drive signal 80 is logic 1. The outputs of flip-flops F1, F2, . . . F*n* are totalled in decoder 56, and AND-gate 82 generates a sampling pulse on line 57 when the input requirements are fulfilled.

When drive signal 80 is logic 0, or when counter 29 is not required to be actuate, flip-flops F1, F2, . . . F*n* are cleared through inverter 84. FIG. 11 does not show the complete inputs to flip-flop group F1, F2, . . . F*n* and AND-gate 83, but it is to be understood that upon obtaining a suitable sampling pulse 57 as determined by speed and write density, more flip-flops may be added in relation to the frequency of clock pulse 82.

Referring again to FIG. 8, pulse 57 resets flip-flops 25, 26 and 27 simultaneously to thereby clear counter 29, whereby it is in ready condition for the next operation. Pulse 57 is also applied through AND-gate 47 to byte counter 18, which comprises flip-flops 30, 31 and 32. It is assumed in FIG. 8 that the minimum number of informations, i.e., the number of bytes which make a distinction between a data block and a noise block is seven, and therefore a three bit counter is illustrated. Until counter 18 registers a logic "1" at each of the three flip-flop outputs, AND-gate 47 is open to count pulses 57. However, when all bits of the counter 18 become "1," AND-gate 58 is activated and its logic "1" output as fed through inverter 59 produces a binary "0" input to AND-gate 47, thus opening AND-gate 47. Thus, when the number of informations due to noise exceeds seven bytes, the byte counter 18 holds the condition thereof and, at the condition reporting time when a timing control is applied to line 48, reports a tape reject signal by line 49 to the channel means. If the number of informations due to noise is less than seven bytes, the output of AND-gate 58 will be logic "0" which will be inverted by inverter 39 to close gate 38 and report a signal 49' to the channel means, indicative that the normal execution of erasing has been accomplished.

The circuit of FIG. 8 described in detail above follows the flow chart of FIG. 7. If flip-flops 31 and 32 and AND-gate 58 are omitted, and the output on the setting side of flip-flop 30 and the output line of AND-gate 58 are connected, the operation illustrated by the flow chart of FIG. 6 will be provided.

Figure 12:
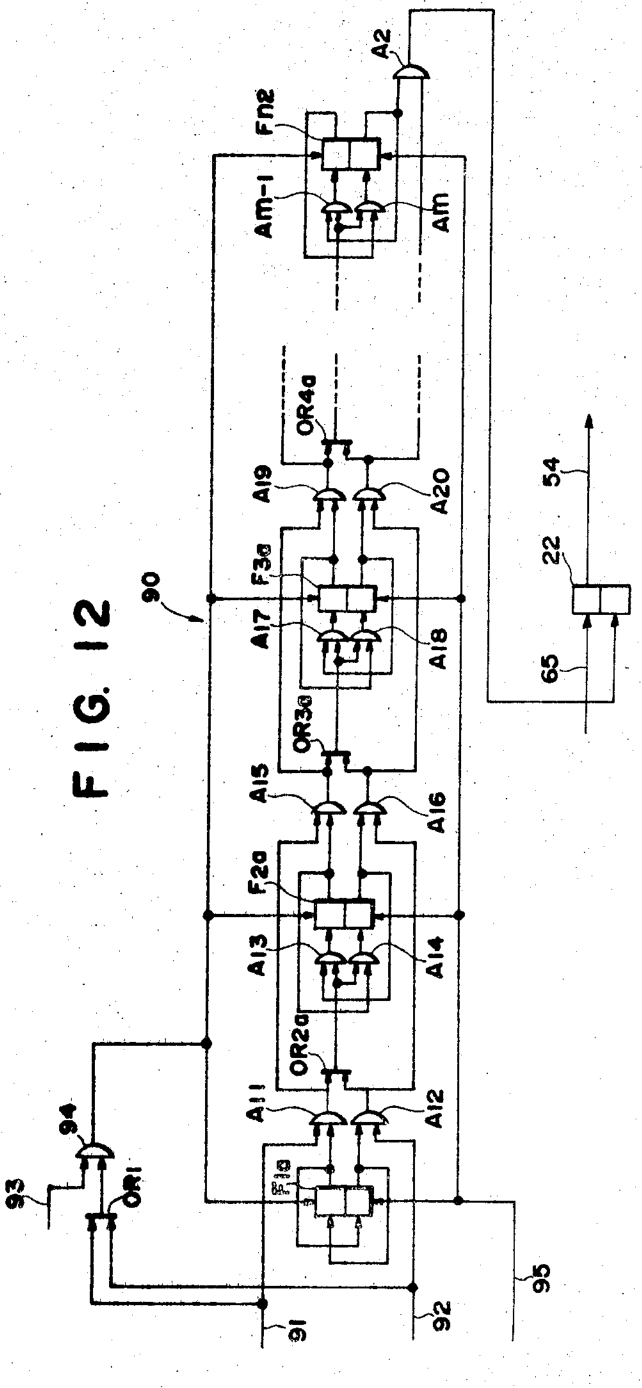
FIG. 12 is a circuit diagram of the counter for memorizing the length of erasing.

In the circuit of FIG. 8, when a block having an error is to be erased, the length of tape erased is determined by the set value of counter 24. Depending upon the length of the block at the time of writing, this provides the disadvantage that when the length of a block is less than or equal to the length of tape erased, the fault on the tape contained in the block can be detected by the erasing operation, but if the block is several times larger than the length of tape erased and the fault on the tape contained in the block is located rearwardly of the erased portion on the tape, it is not possible when erasing from the front end of the block to detect the fault by the erasing operation. In this instance, a series of operations covering erasing/writing (emergence of error)/backspacing, must be repeated until the portion having the fault is checked by the erasing operation, because only in this manner can the normal writing of a block or detection of serious faults be achieved. This would cause a loss in processing speed for the entire computer system and also result in an increase of software program steps. This problem may be eliminated, however, by temporarily memorizing the length of a block or the amount of travel of a tape during the writing operation, and in the subsequent erasing after backspacing, determining the length of erasing according to the amount thus memorized. FIG. 12 illustrates the operation of such a circuit.

FIG. 12 is a fragmentary electrical schematic diagram wherein signal lines 65 and 54 and flip-flop 22 correspond to similarly designated elements in the circuit diagram of FIG. 8. The manner in which flip-flop 22 of FIG. 12 is set and the transmission of an output signal therefrom furthermore is similar to the operation of flip-flop described with respect to FIG. 8. In the FIG. 12 embodiment, flip-flops F1*a*, F2*a*, . . . F*na* comprise a counter circuit 90 which consists further of AND-gates A11, A12, . . . A*m*1, A*m and OR-gates OR2a*, OR3*a*, and OR4*a*, and having functions of addition and reduction. The signal applied to line 91 corresponds to the writing operation and a signal on line 92 corresponds to the erasing operation. The signal applied to line 93 is a clock pulse signal issued from the tape travel system of the magnetic tape unit. It may for illustrative purposes, be obtained from a disc or a gear type coaxially associated with a capstan for tape travel, and a light source and light detector between which the said disc is inserted. The number of signal pulses 93 therefore corresponds to the amount of travel of the tape during the writing operation. When the signal applied to line 91 is logic "1," the count of counter circuit 90 is added by "1" each time the signal on line 93 is gated through AND-gate 94, having its other output connected to the output of OR-gate OR1. Thus, upon termination of the writing operation, counter circuit 90 has a storage value which totals the number of clock pulse signals 93 occurring during the writing operation. During the backspacing operation the contents of counter 90 are retained, and during the erasing operation it is sequentially reduced by one by the clock pulse signal 93, which is also connected to the input of OR-gate OR1. If all flip-flops have a logic "0" output, or when the erase length is coincident with the write length, the output of AND-gate A2 is logic "1," and this output is applied to flip-flop 22 to reset the flip-flop to stop the tape, thereby concluding the erasing operation. Flip-flops F1*a*, F2*a*, . . . F3*a*, F*na* are cleared by a signal applied to the line 95 indicating the issuance of a new write instruction.

Figures 13, 14:
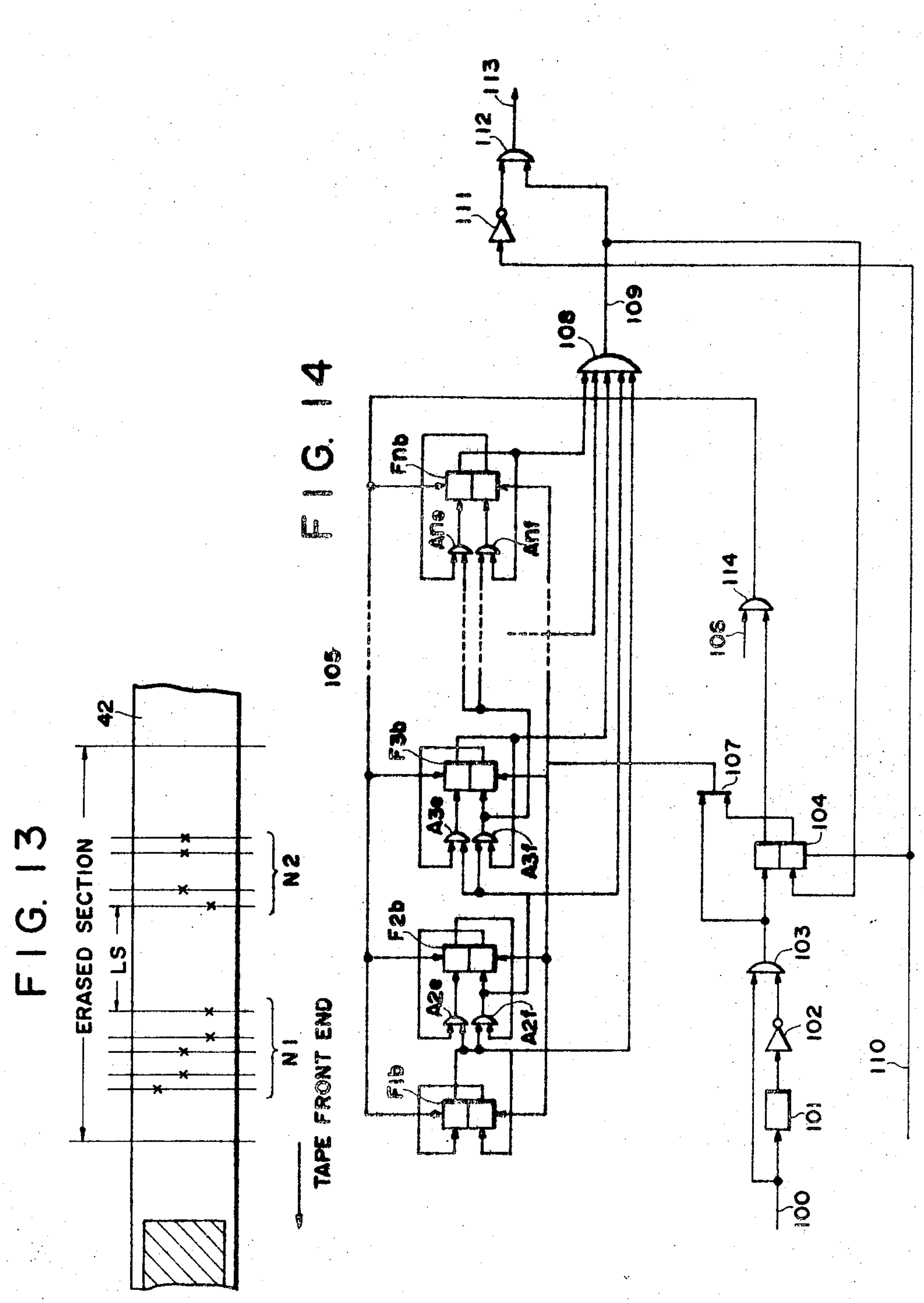
FIG. 13 is a diagram illustrating the portion of trouble in the magnetic tape.
FIG. 14 is a circuit diagram of the counter for the detection of the inter-recording gap (IRG).

In the circuit shown in FIG. 8, the tape is rejected when the totality of noise signals detected, each regarded as one byte, during one erasing operation is determined to consist of seven or more bytes. Depending upon the position of faults on the tape, however, the tape may still be efficiently utilized. In FIG. 13 a portion of the magnetic tape 42 is shown. Usually one block in the read operation would denote a group of informations existing between inter-recording gaps (IRG), which is a portion magnetically erased and indicative of partitioning of a block. In the event the groups of noise signals N1, N2. . . ., as shown in FIG. 13 include less than seven bytes and have IRG-LS longer than a predetermined amount, these blocks may be regarded as noise blocks and may be ignored so that it is not necessary to reject the tape.

FIG. 8 does not indicate the IRG detection circuit, but if such a circuit is added, the counter is cleared when the byte counter indicates less than seven bytes during the erasing operation. One embodiment of such a detection circuit is shown in the electrical schematic diagram of FIG. 14, wherein input signal 100 corresponds to the output signal of OR-gate 28 of FIG. 8. Delay element 101, inverter 102 and AND-gate 103 produce a rising pulse from input signal 100. Flip-flop 104 is set by this rising pulse. Flip-flops F1*b*, F2*b*, F3*b* . . . F*nb* constitute a counter circuit 105 which counts a synchronous clock pulse 106 when flip-flop 104 produces a logic "1" output. The counter circuit 105 is cleared through OR-gate 107 during the period flip-flop 104 is set to produce a logic "1" output, or from the start of an erase operation to the detection of the first noise signal and at every time a new noise signal which can be regarded as one byte is produced.

The output of counter circuit 105 is decoded by decoder 108 which produces an inter-recording gap (IRG) detection signal 109 at its output. Input signal 110 corresponds to the output signal of AND-gate 58 of FIG. 8. Accordingly when the byte counter counts less than seven bytes, signal 110 is at logic "0," which is inverted by inverter 111, to produce a logic "1" input to AND-gate 112, and which issues detection signal 109 to line 113. The signal on line 113 is applied to a clear terminal of flip-flops 30, 31 and 32 of the byte counter of FIG. 8.

Flip-flop 104 is cleared when the byte counter indicates seven bytes, i.e., when the tape rejection becomes clear and thereafter the counter circuit 105 is not actuated. If the noise signals detected during the erasing operation comprise less than seven bytes and thereafter there are normal erased portions longer than the inter-recording gap (IRG), flip-flops 30, 31 and 32 of the byte counter are cleared by the signal appearing on line 113 and flip-flops 104 and F1*b*. . . F*nb* are cleared by the signal 109 in the output line of decoder 108. This causes a new noise checking procedure to be initiated. The number of bits and conditions under which the decoder 108 of counter 105 is operative are determined by the clock pulse 106, the length of the inter-recording gap(IRG), and tape speed.

We claim:

1. In a system for the detection of faults in a magnetic recording medium for an external auxiliary memory device of an information processing unit, in which a write head and a read head are adjacently disposed, data information being recorded by the write head onto the magnetic recording medium and being sequentially read by the read head, with means to detect errors in information recorded onto the magnetic recording medium by the write head, the improvement comprising:

means to erase the portion of the magnetic recording medium upon which data information is erroneously recorded, with the read head being connected to read said portion during the erasing operation.

detection means connected to the read head to detect faults in the magnetic recording medium from noise signals generated when the read head is connected to read the portion of the magnetic recording medium being erased.

2. In the system recited in claim 1, further comprising:

means connected to the erase means to predetermine the length of the magnetic recording medium to be erased when an error is detected.

3. In the system recited in claim 1, further comprising:

means to temporarily store an indication of the length of a block of information recorded onto the magnetic recording medium by the write head, and responsive upon detection of an error in the recorded information to control the erase means to erase the magnetic recording medium a length corresponding to said stored indication.

4. In the system recited in claim 1 further comprising:

means connected to the detection means to determine the number of noise signals generated when the read head is connected to read the portion of the magnetic recording medium being erased, and responsive to the generation of a predetermined number of said noise signals to issue a tape reject signal.

5. In the system recited in claim 1 further comprising:

means connected to the detection means and responsive to the generation of a predetermined number of noise signals during a given time to generate a tape reject signal.

6. In the system recited in claim 1 further comprising:

counter means responsive to count the noise signals occurring during a predetermined time period and responsive to cause a tape reject signal to be issued when a predetermined count is reached during said predetermined time.

7. In the system recited in claim 6 wherein the counter means is reset after said predetermined time expires.

8. In the system recited in claim 6 further comprising:

means to detect the gaps between successive information blocks on the magnetic recording medium, and means responsive to the detection of the gaps to determine the number of noise bytes generated from the erased portion between successive gaps to issue a tape reject signal when a predetermined number of bytes is determined.

* * * * *